Patented Sept. 16, 1941

2,256,368

UNITED STATES PATENT OFFICE 2,256,368

DENATURED MATERIAL

John C. Woodhouse, New Castle, Del., assignor to E. I. du Pont de Nemours & Company, Wilmington, Del., a corporation of Delaware No Drawing. Application July 21, 1938,
Serial No. 220,510

4 Claims. (Cl. 252—366)

This invention relates to denaturants and more particularly to denatured alcohols and the method of denaturing them.

Many proposals have been made in the past for the use of various materials which, when mixed with a substance such as an alcohol, or ester, completely change its taste or odor or both so that it cannot be diverted from its intended use or can readily be identified or both. For example, this procedure has been applied to methanol to avoid its being taken internally, as well as to ethanol and other alcohols which might otherwise be diverted from their intended commercial use to that of a beverage. Similarly, substances such as ethyl acetate, and other esters, which might fairly easily be otherwise converted to alcohols and thus diverted from their intended use, have likewise been denatured. Upon chemical treatment of such esters, the denaturant has been intended to carry over to the alcohol and cause it to be unpotable.

Materials which have been proposed as denaturants before have had one or more characteristics which adapt them for denaturing purposes. There are, however, several special features which it is desirable to have in a denaturant and all of which have not been possessed to a sufficient degree by many of the denaturants previously suggested. Thus, for example, it is desirable that a denaturant have an obnoxious taste and a distinctive odor. Substances have been proposed previously which possess disagreeable tastes but the odor carried by the denaturant has often been of such a character as to make the final denatured alcohol commercially undesirable.

Another characteristic which a denaturant must possess is that of difficulty of removal from the denatured medium. As rapidly as denaturants have been proposed, methods have been discovered for their removal from the denatured medium. The methods utilized for removal of denaturants have been usually chemical treatment of the denatured medium combined with or followed by various distillation steps and further chemical treatment until, finally, relatively pure material has been obtained, free from the denaturing medium.

It is an object of the present invention to overcome the disadvantages of the prior art and to provide a new and improved denaturant and denatured materials.

It is a further object of the present invention to provide a denatured ethyl alcohol which possesses a distinctive but unobjectionable odor, and a taste which renders the ethyl alcohol unpotable.

Other objects and advantages of the present invention will be apparent by reference to the following specification in which the preferred embodiments and details are set forth.

According to the present invention a denatured material from which it is extremely difficult if not impossible to remove the denaturant is prepared by mixing with liquid materials such as gasoline, or an ester such as ethyl acetate, or an alcohol, including such alcohols as methyl, ethyl, and propyl and the like, relatively small quantities of an organic nitro compound of the general formula:

containing only the elements carbon, hydrogen, nitrogen and oxygen, boiling in the range of from 75 to 200° C., and in which R is a saturated or unsaturated alicyclic, acyclic or heterocyclic group which may contain hydroxyl, carbonyl, or alkoxy substituents.

The denaturants of this invention are generally applicable for treatment of any normally liquid material which it is desired to denature although, preferably, the material to be denatured should have a boiling point in the range of about 30° C. to 250° C. From a material having a boiling point in this range it will be found extremely difficult, if not impossible, to remove my denaturant.

My denaturants are also adapted to and effective in denaturing and distinguishing motor fuels from one another in cases, for example, where it is desired to identify and keep separate individual supplies or stocks of gasoline. Specifically, my denaturants are highly advantageous as a means of marking or giving a distinctive odor to tax-free gasoline.

A wide range of alcohols may also be successfully denatured or distinguished from one another according to this invention, such, for example, as methyl alcohol, ethyl alcohol, butyl alcohol, isobutyl alcohol, isopropyl alcohol, and others. Similarly, a large number of esters may be successfully denatured or distinguished from one another, substantially the only requisites being that the ester should have a boiling point in the range above indicated and, further, the ester should be one which might be fairly easily transformed into an alcohol. Thus, for example, in addition to denaturing ethyl esters such as ethyl acetate mentioned before, the denaturants of this invention may be utilized with other esters such as methyl, propyl, isopropyl, butyl and isobutyl acetates and the like or similarly with like formates, propionates, butyrates, isobutyrates and like esters.

The organic nitro compounds of this invention possess a characteristic odor and are unpotable because of odor and taste. Both the odor and the taste persist in spite of drastic treatment utilized for their removal.

The following examples illustrate proportions of various materials which may be utilized as denaturants. It will be noted that small quantities only of the denaturant are necessary for denaturing purposes and that the material remaining after treatment for denaturant removal possesses an undesirable taste and a distinctive odor.

*Example 1.*—160 cc. of a denatured alcohol, prepared by mixing 100 volumes of pure 95% ethyl alcohol and 5 volumes of nitromethane ($CH_3NO_2$, B. P. 101° C.) was mixed with 160 cc. of water and 480 cc. of saturated salt solution. The clear solution was shaken 3 minutes with 40 cc. of white oil and allowed to stand overnight. The alcoholic brine layer was then separated from the white oil and shaken 3 minutes with a new charge of 32 cc. of white oil. After standing an hour the lower layer was removed and treated with 8 g. of activated charcoal for 30 minutes at room temperature. The mixture was filtered and the filtrate treated with an additional 8 g. of activated charcoal for 30 minutes at room temperature. The filtrate from the second charcoal treatment was distilled using a 15 theoretical plate column and a draw-off rate of 1 cc. per minute. 128 cc. of alcohol was recovered. The distillate had the odor and taste of the denaturant and was unpotable.

*Example 2.*—100 cc. of a denatured alcohol, prepared by adding 5 volumes of nitroethane ($C_2H_5NO_2$, B. R. 111°–114° C.) to 100 volumes of pure 95% ethyl alcohol, was treated by the procedure of Example 1. The distillate obtained in the distillation step was unpotable.

*Example 3.*—100 cc. of a denatured alcohol prepared by adding 3 volumes of nitromethane to 100 volumes of pure 95% ethyl alcohol was mixed with 75 cc. of water, 225 cc. of saturated salt solution, 1 g. of sulfuric acid and 20 cc. of toluene. The mixture was shaken approximately 1 minute and allowed to stand 20 minutes. The clear lower layer was then drawn off slowly and extracted with a second 20 cc. portion of toluene. The alcoholic brine layer from the second extraction was filtered through approximately 2 grams of activated carbon and distilled as in Example 1. Six 10 cc. cuts were recovered in the distillation. Each cut had the odor and taste of the denaturant and was unpotable.

*Example 4.*—100 cc. of a denatured alcohol prepared by adding 3 volumes of 2-nitropropane ($CH_3CHNO_2CH_3$, B. P. 118° C.) to 100 volumes of pure 95% ethyl alcohol was mixed with 75 cc. of water, 225 cc. of saturated salt solution and 20 cc. of benzene. The mixture was shaken ½ minute and allowed to stand 30 minutes. The alcoholic brine layer was then extracted with a second 20 cc. portion of benzene. After standing ½ hour the lower layer was filtered through approximately 2 grams of activated carbon and distilled as in Example 1. Eight 10 cc. cuts were recovered and all the cuts were unpotable.

*Example 5.*—100 cc. of a denatured alcohol, prepared by adding 3 volumes of 1-nitropropane ($CH_3CH_2CH_2NO_2$, B. P. 131° C.) to 100 volumes of pure 95% ethyl alcohol was treated by the procedure of Example 4. The cuts obtained in the distillation step had the odor and taste of the denaturant and were unpotable.

*Example 6.*—A denatured gasoline was prepared by adding 1 volume of 2-nitropropane to 100 volumes of gasoline.

*Example 7.*—A denatured power alcohol, containing 20% ethyl alcohol, was prepared by adding 2 volumes of 2-nitropropane to 100 volumes of the alcohol-gasoline blend.

*Example 8.*—A denatured ethyl acetate was prepared by adding 0.5 volumes of 1-nitropropane to 100 volumes of ethyl acetate.

Although the several examples illustrate the use of a variety of nitroparaffins according to this invention, other nitroparaffins may equally as well be substituted therefor, such for example, as 1-nitrobutane, 2-nitrobutane, 2-methyl-1-nitropropane, 2-methyl-2-nitropropane, 1-nitropropane-3, 2-nitroethanol, 2-nitro-1-ethoxyethane, nitroacetone and the like.

The proportions utilized according to the present invention may vary from a very small quantity, such as one-tenth of one per cent, up to ten per cent by volume or more of the alcohol, or other material, which is to be denatured, the amount of denaturant depending entirely upon the degree of odor and taste desired. Mixtures of two or more of the materials of this invention may be utilized and small quantities are generally sufficient, i. e. in the range of 0.1 to 5% by volume. A great advantage of the present denaturant resides in the fact that it does not render the denatured material commercially and scientifically undesirable inasmuch as the character of the denatured material is not changed by the incorporation of my denaturant.

Various changes may be made in the methods and proportions of the present invention without departing therefrom or sacrificing any of the advantages thereof.

I claim:

1. A denatured ethyl alcohol containing as an essential denaturing agent from 0.01 to 10% by volume of a substance selected from the group consisting of nitromethane, nitroethane, 1-nitropropane and 2-nitropropane.

2. A denatured alcohol containing as an essential denaturing agent from .01 to 10% by volume of nitroethane.

3. A denatured alcohol containing as an essential denaturing agent from .01 to 10% by volume of nitropropane.

4. A denatured alcohol containing as an essential denaturing agent from .01 to 10% by volume of 2-nitropropane.

JOHN C. WOODHOUSE.